(12) United States Patent
Huang et al.

(10) Patent No.: US 11,846,834 B2
(45) Date of Patent: Dec. 19, 2023

(54) ARRAY SUBSTRATE AND DISPLAY PANEL

(71) Applicant: HKC CORPORATION LIMITED, Guangdong (CN)

(72) Inventors: Shishuai Huang, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/994,197

(22) Filed: Nov. 25, 2022

(65) Prior Publication Data
US 2023/0161208 A1 May 25, 2023

(51) Int. Cl.
*G02F 1/1362* (2006.01)

(52) U.S. Cl.
CPC .. *G02F 1/136286* (2013.01); *G02F 1/136222* (2021.01)

(58) Field of Classification Search
CPC ......... G02F 1/136286; G02F 1/136222; G02F 1/13454; G02F 1/13452; G02F 1/136254; G02F 1/13458
See application file for complete search history.

(56) References Cited

U.S. PATENT DOCUMENTS

| | | | |
|---|---|---|---|
| RE42,879 E | 11/2011 | Fujii et al. | |
| 2012/0161805 A1* | 6/2012 | Jung | G09G 3/006 324/754.07 |
| 2019/0041711 A1* | 2/2019 | Fujikawa | G02F 1/1362 |
| 2020/0074955 A1* | 3/2020 | Fujikawa | G02F 1/1345 |
| 2020/0355972 A1* | 11/2020 | Jian | G02F 1/13452 |
| 2021/0327774 A1* | 10/2021 | Yang | H01L 22/34 |

FOREIGN PATENT DOCUMENTS

| | | |
|---|---|---|
| CN | 105607316 A | 5/2016 |
| CN | 110224078 A | 9/2019 |
| CN | 110379345 A | 10/2019 |
| CN | 110473464 A | 11/2019 |
| CN | 112102725 A | 12/2020 |
| CN | 112133201 A | 12/2020 |

\* cited by examiner

*Primary Examiner* — Hoan C Nguyen
(74) *Attorney, Agent, or Firm* — Maier & Maier, PLLC

(57) ABSTRACT

The embodiments relate to array substrate technologies. Provided is an array substrate and a display panel, the array substrate includes a display region and a non-display region. A first bonding-lead part, a second bonding-lead part and a third bonding-lead part are arranged in sequence in a bonding area of the non-display region. A first side of the first bonding-lead part is used for connecting with a gate driver unit test wiring, and a second side of the first bonding-lead part is used for connecting with a gate driver signal wiring. A width of the first bonding-lead part is smaller than that of the second bonding-lead part, such that a wiring area is formed on the first side of the first bonding-lead part and/or the second side of the first bonding-lead part, thereby providing sufficient wiring space for the GOA unit test wiring and the GOA signal wiring.

18 Claims, 5 Drawing Sheets

ARRAY SUBSTRATE AND DISPLAY PANEL

CROSS-REFERENCE TO RELATED APPLICATIONS

This application claims the benefit of Chinese patent application No. 202111421038.2 filed on Nov. 26, 2021, the contents of which are incorporated herein by reference.

TECHNICAL FIELD

The present application relates to array substrates, and in particular, to an array substrate and a display panel.

BACKGROUND

Generally, in a typical wiring design of bonding lead, the bonding lead includes data bonding lead, dummy bonding lead, and gate-driver-on-array (GOA) bonding lead.

GOA unit test wiring and GOA signal wiring can vary from several to a dozen depending on product resolution and size, and the width of these wirings is limited by the space above and below the GOA bonding lead, that is, the more wirings, the thinner each wiring and the greater the impedance. For narrow-bezel products, the GOA unit test wiring and the GOA signal wiring are even thinner, which may affect the overall design of the product.

SUMMARY

An embodiment of the present application provides an array substrate and a display panel, in which a wiring area is formed on a first side of a first bonding-lead part and/or a second side of the first bonding-lead part, in order to solve the problem that the first bonding-lead part in the bonding area of the existing array substrates occupies too much space, so that limiting space is provided for the GOA unit test wiring and the GOA signal wiring.

In order to achieve the above-mentioned objectives, an aspect of the present application provides an array substrate, which includes a display region and a non-display region. A first bonding-lead part, a second bonding-lead part and a third bonding-lead part are arranged in sequence in a bonding area of the non-display region. A first side of the first bonding-lead part is used for connecting with a gate driver unit test wiring, and a second side of the first bonding-lead part is used for connecting with a gate driver signal wiring. A width of the first bonding-lead part is smaller than a width of the second bonding-lead part, such that a wiring area is formed on the first side of the first bonding-lead part and/or the second side of the first bonding-lead part.

In an embodiment of the present application, the first bonding-lead part includes a plurality of GOA bonding lead groups, and the GOA bonding lead groups include at least two GOA bonding leads.

In an embodiment of the present application, the first side of the first bonding-lead part has a first wiring area, and the second side of the first bonding-lead part is coplanar with a second side of the second bonding-lead part.

In an embodiment of the present application, the first side of the first bonding-lead part is coplanar with a first side of the second bonding-lead part. The second side of the first bonding-lead part has a second wiring area.

In an embodiment of the present application, the first side of the first bonding-lead part has a first wiring area; the second side of the first bonding-lead part has a second wiring area.

In an embodiment of the present application, the GOA bonding lead is a linear bonding lead, and a first predetermined angle a is formed between an extension direction of the linear bonding lead and an extension direction of the first bonding-lead part.

In an embodiment of the present application, the first bonding-lead part includes a first linear extension section and a second linear extension section located between the first linear extension section and the second bonding-lead part, a second predetermined angle b is formed between an extension direction of the first linear extension section and an extension direction of the second linear extension section.

In an embodiment of the present application, an avoidance space is formed on one end of the second bonding-lead part close to the first bonding-lead part by reducing the number of bonding leads in the second bonding-lead part.

In an embodiment of the present application, the width of the first bonding-lead part is ½ or ⅓ of the width of the second bonding-lead part.

Another aspect of the present application provides a display panel, which includes an array substrate, a liquid crystal layer and a color film substrate. The array substrate and the color film substrate are disposed facing each other, and the liquid crystal layer is located between the array substrate and the color film substrate. The array substrate is the above-mentioned array substrate.

The present application has the following advantageous effects: compared with existing technologies, in the array substrate of the present application, a wiring area is formed on the first side of the first bonding-lead part, or on the second side of the first bonding-lead part, or on both sides of the first bonding-lead part by changing the width of the first bonding-lead part, so as to provide sufficient wiring space for GOA unit test wiring and GOA signal wiring, which can prevent the GOA unit test wiring and the GOA signal wiring from being too thin, and thus ensure that the impedance is kept within a certain range. Especially for products with narrow bezel, normal wiring and operation of the GOA unit test wiring and the GOA signal wiring can be ensured while controlling the bezel size of the product.

BRIEF DESCRIPTION OF THE DRAWINGS

In order to more clearly illustrate the technical proposals in embodiments of the present application, accompanying drawings that are used in the description of the embodiments or exemplary technologies are briefly introduced hereinbelow. Obviously, the drawings in the following description are merely some embodiments of the present application. For those skilled in the art, other drawings can also be obtained according to these drawings without any creative effort.

DETAILED DESCRIPTION OF THE EMBODIMENTS

Figure 1:
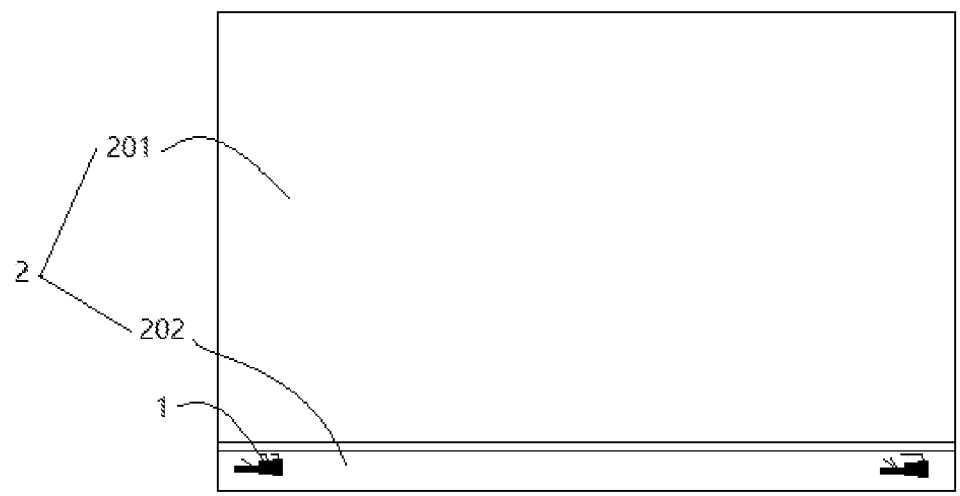
FIG. 1 is a structural schematic diagram of an array substrate according to a first embodiment of the present application.

In order to make the purpose, technical proposals, and advantages of the present application more clearly understood, the present application will be described in further detail hereinbelow with reference to the accompanying drawings and embodiments. It should be understood that the specific embodiments described herein are merely used to explain the present application, but not to limit the present application.

It should be noted that when an element is referred to as being "fixed to" or "arranged on" another element, it can be directly or indirectly on the other element. When an element is referred to as being "connected to" another element, it can be directly connected to the other element or indirectly connected to the other element. The embodiments in this application and the features in the embodiments may be combined with each other without conflict. The present application will be described in detail below with reference to the accompanying drawings and in conjunction with the embodiments.

It is to be understood that the terms "length", "width", "upper", "lower", "front", "rear", "left", "right", "vertical", "horizontal", "top", "bottom", "inside", "outside", etc. for indicating orientations or positional relationships refer to orientations or positional relationships as shown in the accompanying drawings; the terms are for the purpose of illustrating the present application and simplifying the description rather than indicating or implying the device or element must have a certain orientation and be structured or operated by the certain orientation, and therefore cannot be regarded as limitation to the present application.

Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more the features. In the description of the present application, unless otherwise indicated, the meaning of "plural" is two or more than two.

Referring to FIGS. 1 to 9, an aspect of the present application provides an array substrate. The array substrate 2 includes a display region 201 and a non-display region 202. A first bonding-lead part 10, a second bonding-lead part 20 and a third bonding-lead part 30 are arranged in sequence in the bonding area 1 of the non-display region 202. A first side of the first bonding-lead part 10 is used for connecting the gate driver test wiring, and a second side of the first bonding-lead part 10 is used for connecting the gate driver signal wiring. The width of the first bonding-lead part 10 is smaller than the width of the second bonding-lead part 20, such that a wiring area is formed on the first side of the first bonding-lead part 10 and/or the second side of the first bonding-lead part 10. The length of the first bonding-lead part 10 herein is along an extension direction of the first bonding-lead part 10, and the width of the first bonding-lead part 10 is corresponding to the width along a lengthwise direction thereof. The above-mentioned first side and the second side of the first bonding-lead part 10 refer to opposite sides of the first bonding-lead part 10 in the widthwise direction. In the array substrate of the present application, the wiring area is formed on the first side of the first bonding-lead part 10, or on the second side of the first bonding-lead part 10, or on both sides of the first bonding-lead part 10 by changing the width of the first bonding-lead part 10, so as to provide sufficient wiring space for GOA unit test wiring 40 and GOA signal wiring 50, which can prevent the GOA unit test wiring 40 and the GOA signal wiring 50 from being too thin, and thus ensure that the impedance is within a certain range. Especially for products with narrow bezel, normal wiring and operation of the GOA unit test wiring 40 and the GOA signal wiring 50 can be ensured while controlling the bezel size of the product. The first bonding-lead part, the second bonding-lead part and the third bonding-lead part are arranged in sequence. The third bonding-lead part includes a data bonding-lead part, and a lower end of the data bonding-lead part is connected to a fan-shaped wiring entering into the plane, and an upper end thereof is connected to the data unit test wiring. The second bonding-lead part includes a dummy bonding-lead part, namely the idle bonding-lead part, which is mainly used to prevent short circuit and increase the bonding strength and the like.

In this application, the first side of the first bonding-lead part 10 is connected to the GOA unit test wiring 40, and the second side of the first bonding-lead part 10 is connected to the GOA signal wiring 50.

First Embodiment

Figure 2:
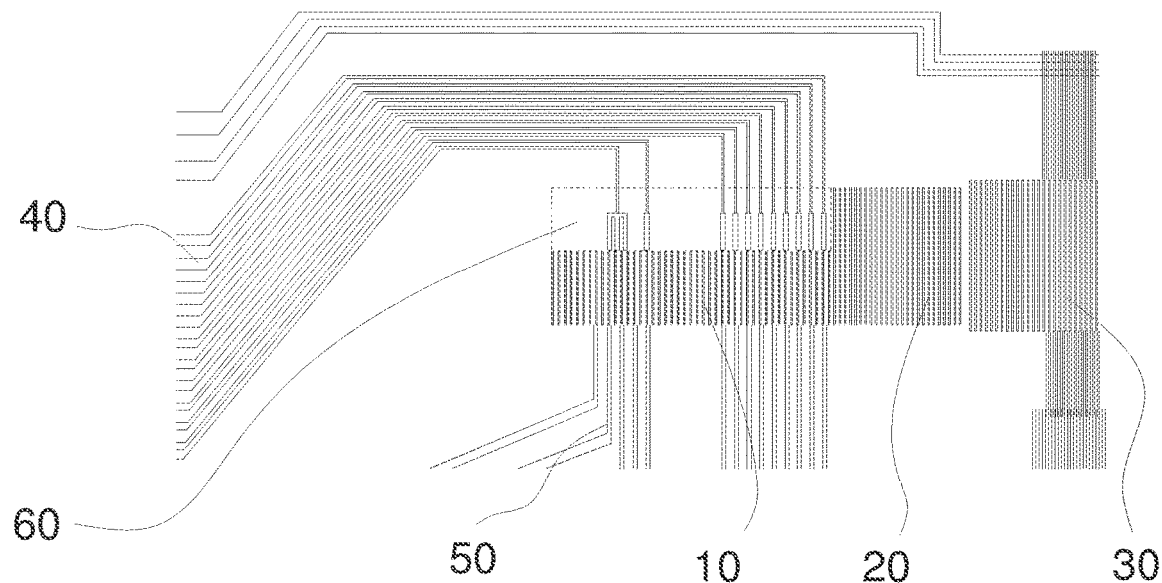
FIG. 2 is a partially enlarged view of the bonding area in the first embodiment of the present application.

Referring to FIG. 2, the first side of the first bonding-lead part 10 is connected to the GOA unit test wiring 40, and the second side of the first bonding-lead part 10 is connected to the GOA signal wiring 50. According to the space required by the GOA signal wiring 50 and the GOA unit test wiring 40, in the first embodiment of the present application, a first wiring area 60 is arranged on the first side of the first bonding-lead part 10. Specifically, the first wiring area 60 is formed between the first side of the first bonding-lead part 10 and an extending line along the first side of the second bonding-lead part 20. The second side of the first bonding-lead part 10 and the second side of the second bonding-lead part 20 are coplanar. In this embodiment, since the GOA unit test wiring 40 located on the first side of the first bonding-lead part 10 requires a larger space, while the GOA signal wiring 50 located on the second side of the first bonding-lead part 10 requires a smaller space, so the first wiring area 60 is correspondingly arranged between the first side of the first bonding-lead part 10 and the first side of the second bonding-lead part 20 in this embodiment, so as to provide sufficient space for the GOA unit test wiring 40 located on the first side of the first bonding-lead part 10. Meanwhile, in order to minimize the change in the length of the GOA binding leads in the first bonding-lead part 10 hence avoid a significant change in impedance, the second side of the first bonding-lead part 10 and the second side of the second bonding-lead part 20 are coplanar.

Second Embodiment

Figure 3:
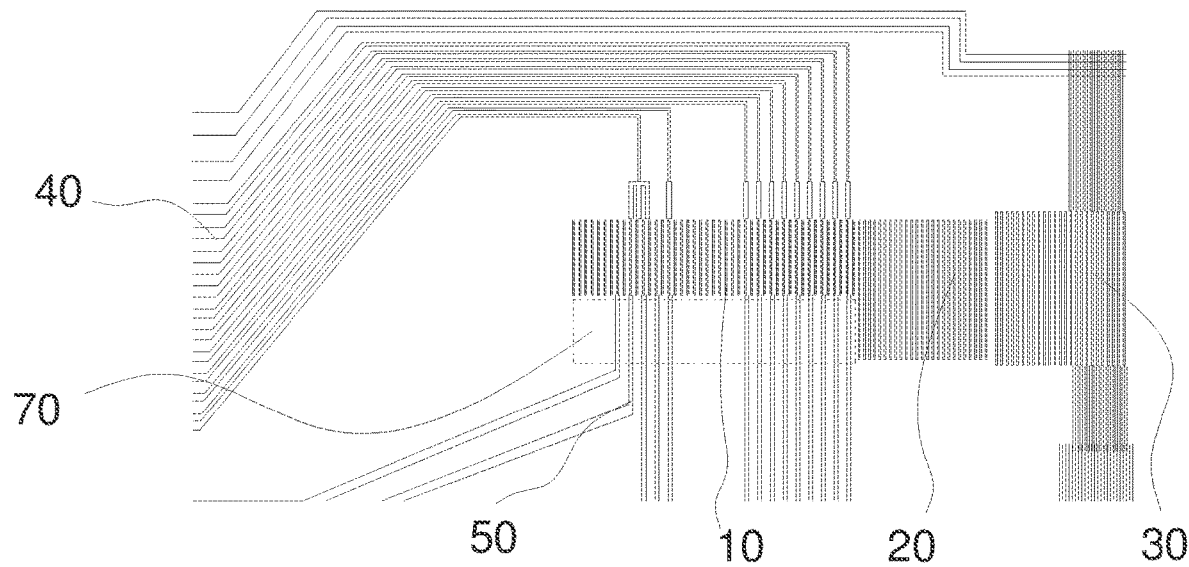
FIG. 3 is a partially enlarged view of the bonding area in a second embodiment of the present application.

Referring to FIG. 3, the first side of the first bonding-lead part 10 is connected to the GOA unit test wiring 40, and the second side of the first bonding-lead part 10 is connected to the GOA signal wiring 50. According to the space required by the GOA signal wiring 50 and the GOA unit test wiring 40, in the present embodiment, the first side of the first bonding-lead part 10 and the first side of the second bonding-lead part 20 are coplanar, and a second wiring area 70 is arranged on the second side of the first bonding-lead part 10. Specifically, the second wiring area 70 is formed between the second side of the first bonding-lead part 10 and an extending line along the second side of the second bonding-lead part 20. In this embodiment, since the GOA unit test wiring 40 located on the first side of the first bonding-lead part 10 requires a smaller space, while the GOA signal wiring 50 located on the second side of the first bonding-lead part 10 requires a larger space, so the second wiring area 70 is correspondingly arranged between the second side of the first bonding-lead part 10 and the second side of the second bonding-lead part 20 in this embodiment, so as to provide sufficient space for the GOA signal wiring 50 located on the second side of the first bonding-lead part 10. Meanwhile, in order to minimize the change in the length of the GOA binding leads in the first bonding-lead part 10 hence avoid a significant change in impedance, the first side of the first bonding-lead part 10 and the first side of the second bonding-lead part 20 are co-linear.

Third Embodiment

Figure 4:
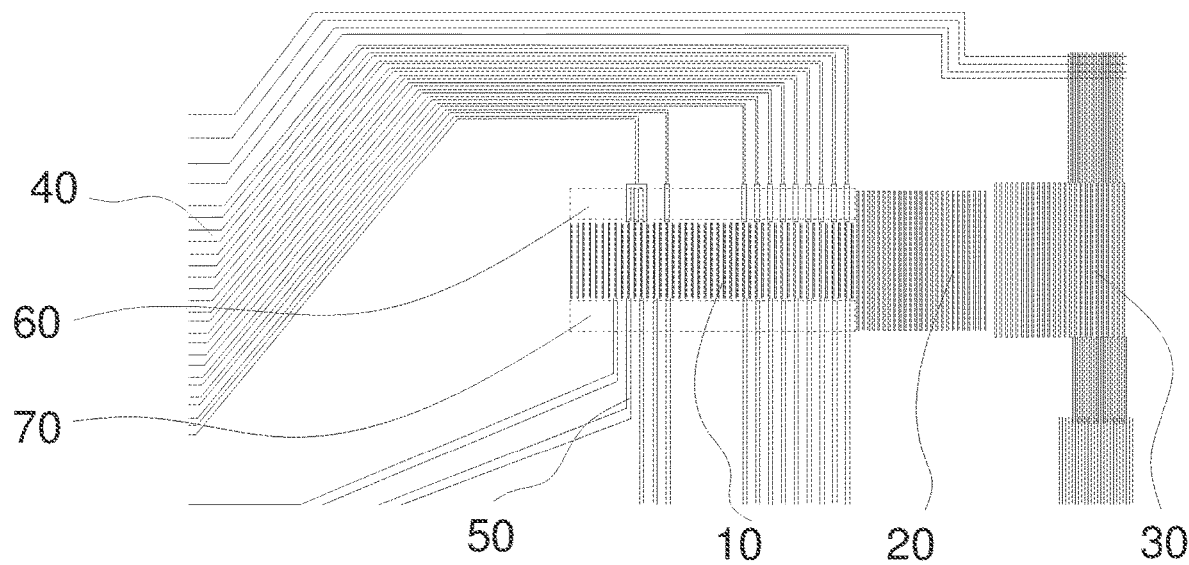
FIG. 4 is a partially enlarged view of the bonding area in a third embodiment of the present application.

Referring to FIG. 4, the first side of the first bonding-lead part 10 is connected to the GOA unit test wiring 40, and the second side of the first bonding-lead part 10 is connected to the GOA signal wiring 50. According to the space required by the GOA signal wiring 50 and the GOA unit test wiring 40, a first wiring area 60 is arranged on the first side of the first bonding-lead part 10, and a second wiring area 70 is arranged on the second side of the first bonding-lead part 10. Specifically, the first wiring area 60 is formed between the first side of the first bonding-lead part 10 and an extending line along the first side of the second bonding-lead part 20, and the second wiring area 70 is formed between the second side of the first bonding-lead part 10 and an extending line along the second side of the second bonding-lead part 20. In this embodiment, since the GOA unit test wiring 40 located on the first side of the first bonding-lead part 10 requires a large space, and the GOA signal wiring 50 located on the second side of the first bonding-lead part 10 also requires a large space, therefore, the first wiring area 60 is arranged between the first side of the first bonding-lead part 10 and the first side of the second bonding-lead part 20 for providing sufficient space for the GOA unit test wiring 40 located on the first side of the first bonding-lead part 10, and the second wiring area 70 is arranged between the second side of the first bonding-lead part 10 and the second side of the second bonding-lead part 20 for providing sufficient space for the GOA signal wiring 50 located on the second side of the first bonding-lead part 10. The size of the first wiring area 60 and the size of the second wiring area 70 are the same.

Figure 5:
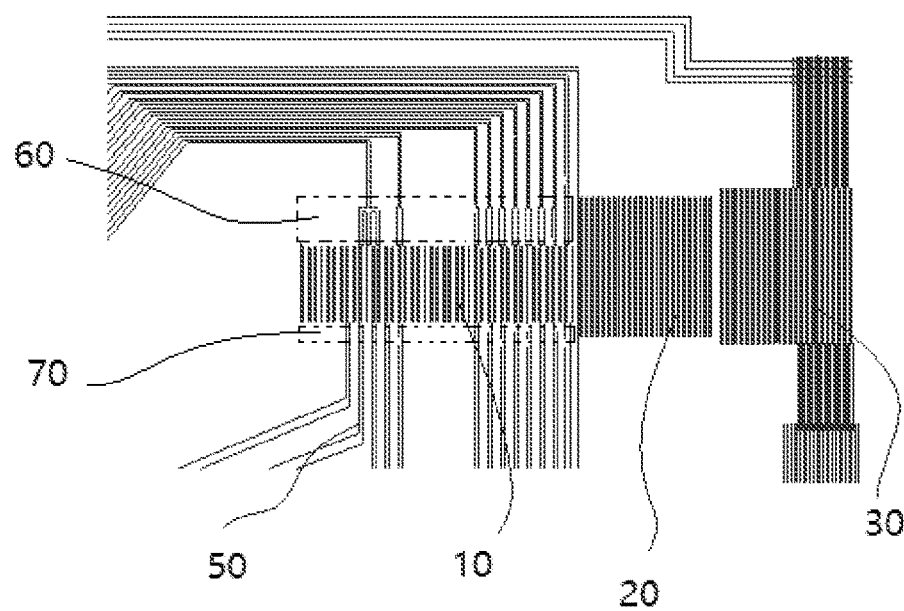
FIG. 5 is a partially enlarged view of an arrangement in which the size of the first wiring area is larger than the size of the second wiring area according to the third embodiment of the present application.

Referring to FIG. 5, this embodiment also includes a first wiring area 60 and a second wiring area 70. Differing from the third embodiment, the size of the first wiring area 60 is larger than that of the second wiring area 70 in this embodiment.

Figure 6:
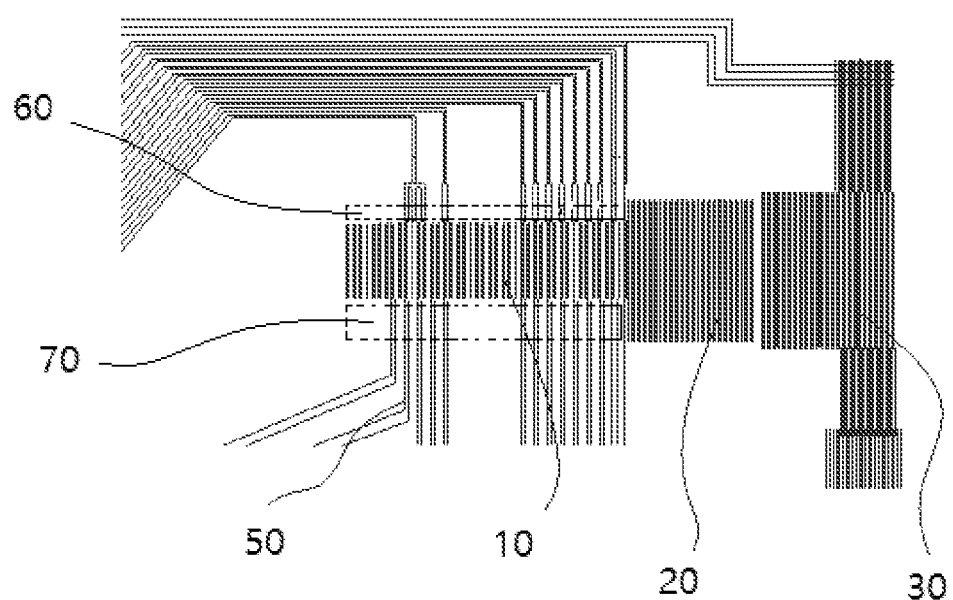
FIG. 6 is a partially enlarged view of an arrangement in which the size of the first wiring area is less than the size of the second wiring area according to the third embodiment of the present application.

Referring to FIG. 6, this embodiment also includes a first wiring area 60 and a second wiring area 70. Differing from the third embodiment, the size of the first wiring area 60 is smaller than that of the second wiring area 70 in this embodiment.

Referring to FIG. 2, in order to fully utilize the space of the first bonding-lead part 10, the GOA bonding leads in this embodiment are linear bonding leads, and the extension direction of the linear bonding leads is perpendicular to the lengthwise direction of the first bonding-lead part 10, and the lengthwise direction of the first bonding-lead part 10 is the extension direction thereof.

Figure 8:
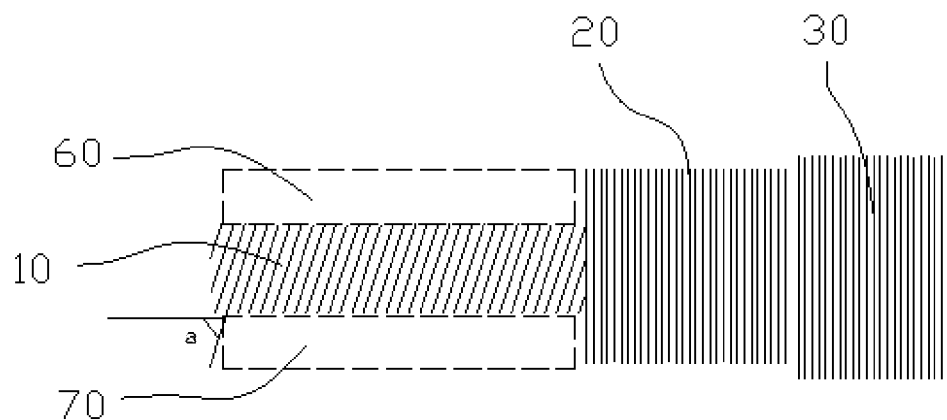
FIG. 8 is an enlarged view of the GOA bonding lead in an embodiment of the present application.

Referring to FIG. 8, in other embodiments, the extension direction of the GOA bonding leads may also be diagonal, and the length of the diagonal GOA bonding leads may be shortened and the width thereof may be adjusted. Specifically, the GOA bonding leads in this embodiment are linear bonding leads, having a first predetermined angle a between the extension direction of the linear bonding leads and the extension direction of the first bonding-lead part 10. The first predetermined angle a may be 30°, 45°, 60°, 75°, and the like, any angle that may save space on the first side and/or the second side of the first bonding-lead part 10. In a specific embodiment, the width of the first bonding-lead part 10 is reduced, which results in shortening of the GOA bonding leads in the first bonding-lead part 10, thus an increase in the impedance of single GOA bonding lead. In order to compensate for the increased impedance caused by the length reduction of the GOA bonding lead, in this embodiment, the first bonding-lead part 10 includes a plurality of GOA bonding lead groups 11, and each GOA bonding lead group 11 includes at least two GOA bonding leads. The first determined angle a is formed between the extension direction of the GOA bonding lead groups 11 and the extension direction of the first bonding-lead part 10. That is, each GOA bonding lead group 11 corresponds to the previously mentioned single GOA bonding lead, except that each GOA bonding lead group 11 includes at least two GOA bonding leads, replacing the single lead with multiple leads. Therefore, the overall cross-sectional area is increased and the impedance can be reduced, thus compensating for the increased impedance due to length reduction, and each GOA bonding lead is diagonally arranged. The number of GOA bonding leads included in each GOA bonding lead group 11 may be two, three, four, and the like, with the GOA bonding leads arranged in parallel, and the number may be adjusted according to the specific impedance to be compensated. In another embodiment, the GOA bonding lead group 11 may not be provided, instead, a single GOA bonding lead is provided, corresponding to the previously mentioned single GOA bonding lead, and the single GOA bonding lead is arranged such that a first predetermined angle a is formed between the extension direction of the single GOA bonding lead and the extension direction of the first bonding-lead part 10. The present embodiment differs in that a thickened GOA bonding lead, which is individually manufactured and thicker than the conventional GOA bonding leads, is used, which increases the overall cross-sectional area and reduces the impedance, thereby compensating for the increased impedance due to the reduced length.

Figure 9:
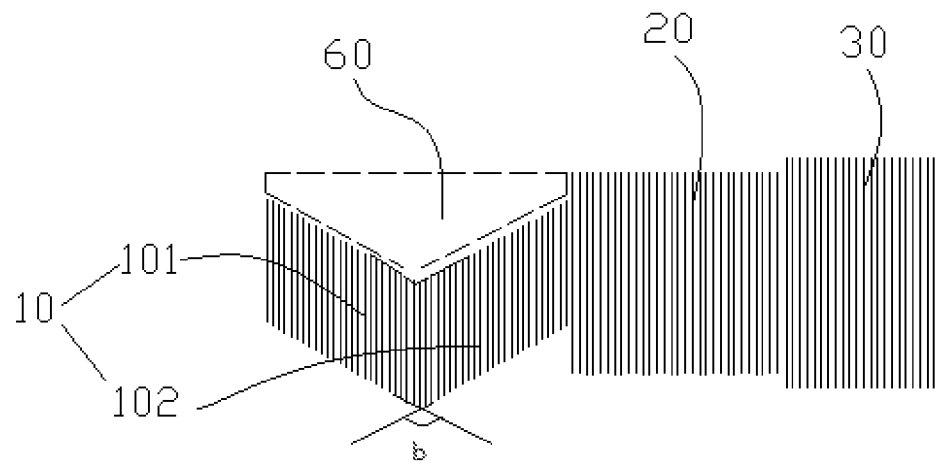
FIG. 9 is an enlarged view of the first bonding-lead part arranged in V-shape in an embodiment of the present application.

Referring to FIG. 9, in another embodiment, the first bonding-lead part 10 is arranged in a V-shape, and the width of the first bonding-lead part 10 is less than the width of the second bonding-lead part 20 so as to form a wiring area on the first side of the first bonding-lead part 10 and/or the second side of the first bonding-lead part 10. in the present embodiment, the first bonding-lead part 10 includes a first linear extension section 101 and a second linear extension section 102 located between the first linear extension section 101 and the second bonding-lead part 20. A second predetermined angle b is formed between the extension direction of the first linear extension section 101 and the extension direction of the second linear extension section 102, and the second predetermined angle b may be 120°, 135°, 150°, and the like, depending on the specific arrangement of the GOA unit test wiring 40 and the GOA signal wiring 50. In other embodiments, the first bonding-lead part 10 may be arranged in a trapezoidal shape, a parallelogram shape, or an S-shape, according to the specific arrangement of the wiring, so that the space utilization of the first bonding-lead part 10 can be maximized.

Fourth Embodiment

Figure 7:
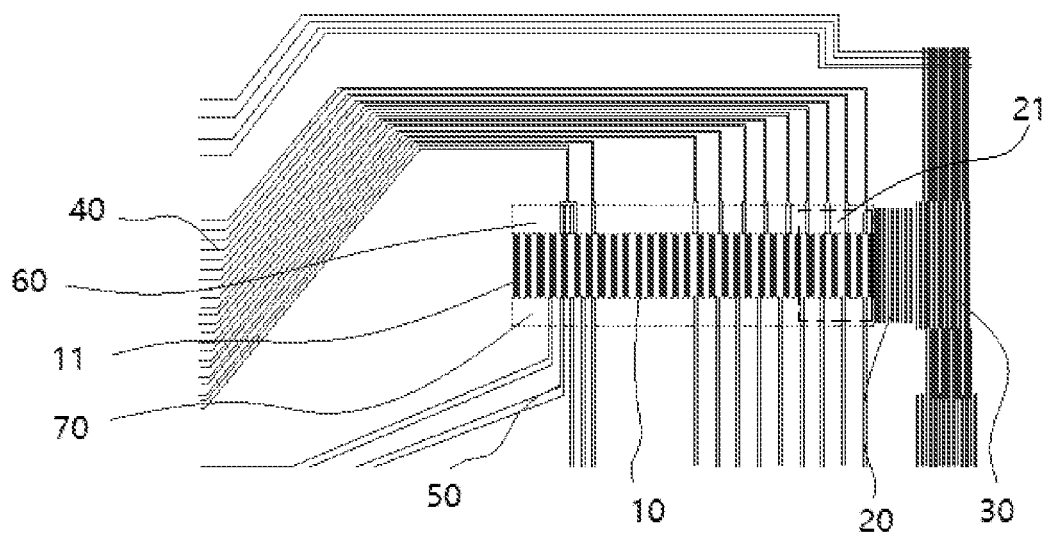
FIG. 7 is a partially enlarged view of the bonding area in a fourth embodiment of the present application.

Referring to FIG. 7, the width of the first bonding-lead part 10 is adjusted to be less than the width of the second bonding-lead part 20, where the width of the second bonding-lead part 20 remains unchanged, the width of the first bonding-lead part 10 is thus reduced, which results in shortening of the GOA bonding leads in the first bonding-lead part 10, thus an increase in the impedance of single GOA bonding lead. In order to compensate for the increased impedance caused by the length reduction of the GOA bonding lead, in this embodiment, the first bonding-lead part 10 includes a plurality of GOA bonding lead groups 11, and each GOA bonding lead group 11 includes at least two GOA bonding leads. That is, each GOA bonding lead group 11 corresponds to the previously mentioned single GOA bonding lead, except that each GOA bonding lead group 11 includes at least two GOA bonding leads, replacing the single lead with multiple leads. Therefore, the overall cross-sectional area is increased and the impedance can be reduced, thus compensating for the increased impedance due to length reduction.

Furthermore, the number of GOA bonding leads included in each GOA bonding lead group 11 may be two, three, four, and the like, and the number may be adjusted according to the specific impedance to be compensated. In another embodiment, the GOA bonding lead group 11 may not be provided, instead, a single GOA bonding lead is provided, corresponding to the previously mentioned single GOA bonding lead. The present embodiment differs from the previous embodiments in that a thickened GOA bonding lead, which is individually manufactured and thicker than the conventional GOA bonding leads, is used, which increases the overall cross-sectional area and reduces the impedance, thereby compensating for the increased impedance due to the reduced length.

In order to compensate for the increased impedance due to the reduced length of the GOA bonding lead, the first bonding-lead part 10 includes a plurality of GOA bonding lead groups 11, and each GOA bonding lead group 11 includes at least two GOA bonding leads, replacing the single lead with multiple leads. However, the length of the first bonding-lead part 10 thereby increasing. In order to provide space for the bonding-lead part 10 that is increased in length within a limited space, in this embodiment, an avoidance space 21 is provided at an end of the second bonding-lead part 20 near the first bonding-lead part 10. By reducing the number of leads in the second bonding-lead part 20 to form the avoidance space 21, sufficient space is provided for the first bonding-lead part 10 that is increased in length.

In a specific embodiment, the number of GOA bonding leads included in each GOA bonding lead group 11 may be two or three, and the number may be adjusted according to the specific impedance to be compensated. For an easier manufacture and aiding in the adjustment to the number of leads in the second bonding-lead part 20, the width of the first bonding-lead part 10 is ½ or ⅓ of the width of the second bonding-lead part 20 in this embodiment.

Fifth Embodiment

Figure 10:
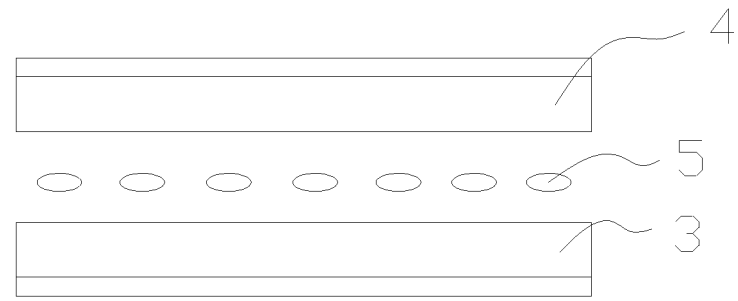
FIG. 10 is a schematic diagram showing an internal structure of the display panel in a fifth embodiment of the present application.

Referring to FIG. 10, according to another aspect of the present application, a display panel is provided, the display panel includes an array substrate 3, a liquid crystal layer 5 and a color film substrate 4. The array substrate 3 and the color film substrate 4 are disposed facing each other, and the liquid crystal layer 5 is located between the array substrate 3 and the color film substrate 4, and the array substrate 3 is the above-mentioned array substrate.

In summary, the array substrate provided by the embodiments of the present application at least has the following advantageous effects:

in the array substrate of the present application, a wiring area is formed on the first side of the first bonding-lead part, or on the second side of the first bonding-lead part, or on both sides of the first bonding-lead part by changing the width of the first bonding-lead part, so as to provide sufficient wiring space for GOA unit test wiring and GOA signal wiring, which can prevent the GOA unit test wiring and the GOA signal wiring from being too thin, and thus ensure that the impedance is kept within a certain range. Especially for products with narrow bezel, normal wiring and operation of the GOA unit test wiring and the GOA signal wiring can be ensured while controlling the bezel size of the product.

The above are merely optional embodiments of the present application, and are not intended to limit the present application. Any modification, equivalent replacement, and improvement made within the spirit and principle of the present application shall fall within the scope of protection of the present application.

What is claimed is:

1. An array substrate, comprising:
    a display region, and
    a non-display region;
   wherein
    a first bonding-lead part, a second bonding-lead part and a third bonding-lead part are sequentially arranged in a bonding area of the non-display region; a first side of the first bonding-lead part is used for connecting with a gate driver test wiring, and a second side of the first bonding-lead part is used for connecting with a gate driver signal wiring;
    a width of the first bonding-lead part is smaller than a width of the second bonding-lead part, such that a wiring area is formed on the first side of the first bonding-lead part and/or the second side of the first bonding-lead part; and
    the first side of the first bonding-lead part and the second side of the first bonding-lead part are opposite sides in a widthwise direction of the first bonding-lead part.

2. The array substrate according to claim 1, wherein the first bonding-lead part comprises a plurality of gate-driveron-array (GOA) bonding lead groups, and each of the plurality of GOA bonding lead groups comprises at least two GOA bonding leads.

3. The array substrate according to claim 1, wherein the first side of the first bonding-lead part has a first wiring area, and the second side of the first bonding-lead part is coplanar with a second side of the second bonding-lead part.

4. The array substrate according to claim 1, wherein the first side of the first bonding-lead part is coplanar with a first side of the second bonding-lead part, and the second side of the first bonding-lead part has a second wiring area.

5. The array substrate according to claim 1, wherein the first side of the first bonding-lead part has a first wiring area, and the second side of the first bonding-lead part has a second wiring area.

6. The array substrate according to claim 2, wherein the GOA bonding lead is a linear bonding lead, and a first predetermined angle a is formed between an extension direction of the linear bonding lead and an extension direction of the first bonding-lead part.

7. The array substrate according to claim 6, wherein
the first bonding-lead part comprises a first linear extension section and a second linear extension section;
the second linear extension section is located between the first linear extension section and the second bonding-lead part; and
a second predetermined angle b is formed between an extension direction of the first linear extension section and an extension direction of the second linear extension section.

8. The array substrate according to claim 2, wherein an avoidance space is formed on one end of the second bonding-lead part close to the first bonding-lead part by reducing the number of bonding leads in the second bonding-lead part.

9. The array substrate according to claim 1, wherein the width of the first bonding-lead part is ½ or ⅓ of the width of the second bonding-lead part.

10. A display panel, comprising:
an array substrate, the array substrate comprising: a display region, and a non-display region;
a liquid crystal layer, and
a color film substrate;
wherein
the array substrate and the color film substrate are disposed facing each other, and the liquid crystal layer is located between the array substrate and the color film substrate;
a first bonding-lead part, a second bonding-lead part and a third bonding-lead part are sequentially arranged in a bonding area of the non-display region; a first side of the first bonding-lead part is used for connecting with a gate driver test wiring, and a second side of the first bonding-lead part is used for connecting with a gate driver signal wiring; and
a width of the first bonding-lead part is smaller than a width of the second bonding-lead part, such that a wiring area is formed on the first side of the first bonding-lead part and/or the second side of the first bonding-lead part; and
the first side of the first bonding-lead part and the second side of the first bonding-lead part are opposite sides in a widthwise direction of the first bonding-lead part.

11. The display panel according to claim 10, wherein the first bonding-lead part comprises a plurality of GOA bonding lead groups, and each of the plurality of GOA bonding lead groups comprises at least two GOA bonding leads.

12. The display panel according to claim 10, wherein the first side of the first bonding-lead part has a first wiring area, and the second side of the first bonding-lead part is coplanar with a second side of the second bonding-lead part.

13. The display panel according to claim 10, wherein the first side of the first bonding-lead part is coplanar with a first side of the second bonding-lead part, and the second side of the first bonding-lead part has a second wiring area.

14. The display panel according to claim 10, wherein the first side of the first bonding-lead part has a first wiring area, and the second side of the first bonding-lead part has a second wiring area.

15. The display panel according to claim 11, wherein the GOA bonding lead is a linear bonding lead, and a first predetermined angle a is formed between an extension direction of the linear bonding lead and an extension direction of the first bonding-lead part.

16. The display panel according to claim 15, wherein
the first bonding-lead part comprises a first linear extension section and a second linear extension section;
the second linear extension section is located between the first linear extension section and the second bonding-lead part; and
a second predetermined angle b is formed between an extension direction of the first linear extension section and an extension direction of the second linear extension section.

17. The display panel according to claim 11, wherein an avoidance space is formed on one end of the second bonding-lead part close to the first bonding-lead part by reducing the number of bonding leads in the second bonding-lead part.

18. The display panel according to claim 10, wherein the width of the first bonding-lead part is ½ or ⅓ of the width of the second bonding-lead part.

* * * * *

UNITED STATES PATENT AND TRADEMARK OFFICE
CERTIFICATE OF CORRECTION

Page 1 of 1

PATENT NO. : 11,846,834 B2
APPLICATION NO. : 17/994197
DATED : December 19, 2023
INVENTOR(S) : Huang et al.

It is certified that error appears in the above-identified patent and that said Letters Patent is hereby corrected as shown below:

On the Title Page

Please add:
(30) Foreign Application Priority Data
November 26, 2021 (CN) ........................ 202111421038.2

Signed and Sealed this
Thirtieth Day of January, 2024

Katherine Kelly Vidal
*Director of the United States Patent and Trademark Office*